United States Patent
Richter

(10) Patent No.: US 9,765,632 B2
(45) Date of Patent: Sep. 19, 2017

(54) PROCESS FOR PRODUCING A TIAL GUIDE VANE RING FOR A GAS TURBINE AND A CORRESPONDING GUIDE VANE RING

(71) Applicant: MTU AERO ENGINES AG, Munich (DE)

(72) Inventor: Karl-Hermann Richter, Markt Indersdorf (DE)

(73) Assignee: MTU AERO ENGINES AG, Munich (DE)

( * ) Notice: Subject to any disclaimer, the term of this patent is extended or adjusted under 35 U.S.C. 154(b) by 577 days.

(21) Appl. No.: 13/962,005

(22) Filed: Aug. 8, 2013

(65) Prior Publication Data

US 2014/0044532 A1 Feb. 13, 2014

(30) Foreign Application Priority Data

Aug. 9, 2012 (EP) ...................................... 12179785

(51) Int. Cl.
*F01D 5/14* (2006.01)
*F01D 5/22* (2006.01)
(Continued)

(52) U.S. Cl.
CPC .............. *F01D 5/28* (2013.01); *B23P 15/006* (2013.01); *C22F 1/183* (2013.01); *F01D 5/048* (2013.01); *F01D 5/146* (2013.01); *F01D 5/22* (2013.01); *F01D 5/30* (2013.01); *Y02T 50/672* (2013.01); *Y02T 50/673* (2013.01); *Y10T 29/49336* (2015.01)

(58) Field of Classification Search
CPC . F01D 5/048; F01D 5/146; F01D 5/22; F01D 5/28; B23P 15/006; C22F 1/183; Y02T 50/672; Y02T 50/673; Y10T 29/49336
See application file for complete search history.

(56) References Cited

U.S. PATENT DOCUMENTS 2,277,484 A * 3/1942 Flanders ................. F01D 5/225
 416/189
5,032,353 A * 7/1991 Smarsly ................ B22F 1/0003
 419/12

(Continued)

FOREIGN PATENT DOCUMENTS

DE 102009013819 A1 9/2010
GB 1287223 A * 8/1972 ............. F01D 5/225
(Continued)

OTHER PUBLICATIONS

LTC William A. Baeslack, III, "Joining of Gamma Titanium Aluminides," Sep. 2002.*
(Continued)

*Primary Examiner* — Audrey K Bradley
(74) *Attorney, Agent, or Firm* — Abel Law Group, LLP

(57) ABSTRACT

Disclosed is a process for producing a blade or vane ring segment for a gas turbine, in particular for an aero engine, and also to a correspondingly produced blade or vane ring segment, the process comprising:
  forging at least two blanks made of a TiAl material,
  joining the blanks to form a blade or vane ring by means of an integral connection process, and
  remachining of the blank composite by material-removing processes.

11 Claims, 3 Drawing Sheets

(51) Int. Cl.
*F01D 5/28* (2006.01)
*F01D 5/30* (2006.01)
*B23P 15/00* (2006.01)
*C22F 1/18* (2006.01)
*F01D 5/04* (2006.01)

(56) References Cited

U.S. PATENT DOCUMENTS

| | | | |
|---|---|---|---|
| 5,518,562 A * | 5/1996 | Searle | B23K 20/129 |
| | | | 156/580 |
| 2001/0022946 A1* | 9/2001 | Tetsui | B21J 1/025 |
| | | | 420/418 |
| 2004/0094246 A1* | 5/2004 | Kelly | B23K 15/0006 |
| | | | 148/524 |
| 2010/0181298 A1* | 7/2010 | Gindorf | B23K 1/0018 |
| | | | 219/617 |
| 2011/0091324 A1* | 4/2011 | Holzschuh | B23P 15/006 |
| | | | 416/200 A |

FOREIGN PATENT DOCUMENTS

| | | | |
|---|---|---|---|
| JP | 06299306 A | * | 10/1994 |
| JP | 10184305 A | * | 7/1998 |
| JP | 2003053520 A | * | 2/2003 |

OTHER PUBLICATIONS

Khantha, M., Vitek, V., & Pope, D. P. (2000). Strain-Rate Dependence of the Brittle-to-Ductile Transition Temperature in TiAl.*

* cited by examiner

PROCESS FOR PRODUCING A TIAL GUIDE VANE RING FOR A GAS TURBINE AND A CORRESPONDING GUIDE VANE RING

CROSS-REFERENCE TO RELATED APPLICATIONS

The present application claims priority under 35 U.S.C. §119 of European Patent Application No. 12179785.6, filed Aug. 9, 2012, the entire disclosure of which is expressly incorporated by reference herein.

BACKGROUND OF THE INVENTION

1. Field of the Invention

The present invention relates to a process for producing a blade or vane ring for a gas turbine, in particular for an aero engine, and also to a corresponding blade or vane ring segment.

2. Discussion of Background Information

DE 10 2009 013 819 A1 discloses a process for producing a guide blade or vane ring, in which blade or vane blanks are produced, for example, by forging in order to then be welded together to form a guide blade or vane segment. This is intended to achieve a cost-effective process for producing a guide blade or vane ring, and instances of offsetting of adjacent blades or vanes with respect to one another are to be avoided, in order to achieve an optimization in terms of fluid mechanics.

However, DE 10 2009 013 819 A1 does not describe that the proposed process could also be used to produce rotor blades or rotor blade or vane ring segments which are exposed to strong centrifugal forces owing to the rotary movement.

In this respect in particular, however, in the case of rapidly rotating components of a gas turbine and in particular of an aero engine, there is the need to combine a suitable material selection with a necessary design of the components and an efficient and suitable production process. Thus, for example, for rapidly rotating low-pressure turbine blades or vanes, it is advantageous to produce the latter from a TiAl material, since the TiAl materials have a low specific weight and at the same time the required mechanical strength values and also sufficient resistance to the atmosphere prevailing in the working environment. However, the TiAl blades or vanes used here have to be produced by forging, in order to establish a material microstructure which satisfies the strength requirements by the suitable forging processes. At the same time, however, it is advantageous to use blade or vane ring segments, for example what are known as blade or vane twins, i.e. blade or vane ring segments having two main blade or vane parts, which have a common blade or vane root. As a result, optimization in terms of structural mechanics is possible, making it possible to efficiently connect the blades or vanes to a rotating disk of a gas turbine and ensuring an optimum load transfer.

However, the forging processes required for the properties of a TiAl blade or vane are difficult to carry out for large components, such as blade or vane ring segments, if a specific microstructure setting is required. Accordingly, it is difficult to make a production of TiAl blades or vanes by forging compatible with a combination of the blades or vanes to form blade or vane ring segments.

It is therefore desirable to have available a TiAl blade or vane ring segment, in particular for rotor blades of a gas turbine and in particular of an aero engine, in the case of which both the advantageous properties of the TiAl material with a low weight and also the required setting of the strength values by suitable forging processes can be combined with a cost-effective production. A corresponding process should therefore be easily feasible as a whole and provide reliable and reproducible results in the form of blade or vane ring segments, in particular rotor blade or vane ring segments, which can be subjected to high levels of loading and have a low weight.

SUMMARY OF THE INVENTION

The present invention provides a process for producing a blade or vane ring segment for a gas turbine, in particular for an aero engine. The process comprises:
(a) forging at least two blanks made of a TiAl material,
(b) joining the blanks to form a blade or vane ring segment by an integral connection process, and
(c) remachining of a blank composite thus obtained by a material-removing process.

In one aspect of the process, one or more heat treatments may be carried out between steps (b) and (c) or after step (c).

In another aspect, step (b) may be effected by laser beam welding, electron beam welding, high-temperature soldering, or friction welding, in particular linear friction welding, orbital friction welding, or multi-orbital friction welding.

In yet another aspect, the TiAl material may be preheated above a brittle-ductile transition temperature of the TiAl material during laser beam welding or electron beam welding.

In a still further aspect of the process of the present invention, the soldering in step (b) may be carried out by local heating, in particular inductive heating and/or Ti-based or Ni-based solders may be used for the soldering.

In another aspect, the blanks may be formed as cuboids, as cuboids with protruding joining zones or as near net shape components.

The present invention also provides a blade or vane ring segment for a gas turbine, in particular for an aero engine. The segment is made of a TiAl material and has at least two adjacent main blade or vane parts, at least two adjacent main blade or vane parts having a single common blade or vane root.

In one aspect of the segment, the segment is produced by the process of the present invention as set forth above (including the various aspects thereof).

According to the invention, the process known from DE 10 2009 013 819 A1 for guide blade or vane ring segments is transferred to blade or vane ring segments in general and rotor blade or vane ring segments in particular, in which case it has surprisingly been found that the process can be used for the material TiAl, which is difficult to process, and materials based thereon, without the required microstructure, which has been produced by forging processes, being influenced in such a manner that it would no longer be suitable for use in turbine parts subjected to high levels of loading.

In particular, it has been found that the process according to the invention makes it possible to produce a blade or vane ring segment for a gas turbine, in particular for an aero engine, and in particular a rotor blade ring segment, from a TiAl material, in the case of which at least two adjacent blade or vane parts have a single common blade or vane root. Accordingly, according to a further aspect of the present invention, protection is claimed for a corresponding blade or vane ring segment independently of and in combination with other aspects of the invention.

The process comprises the following process steps:
forging at least two blanks made of a TiAl material,
joining the blanks to form a blade or vane ring by means of an integral connection process, and
remachining of the blank composite obtained by material-removing processes.

In the first step of the process, the microstructure required for the mechanical properties of the TiAl material is set by suitable forming or forging, to be precise at least in a base structure, which can then be optimized by subsequent heat treatment. At the same time, the forming or forging can give the blanks a shape which can range over a broad range from basic shapes not matched to the final shape to near net shape blanks.

The remachining of the joined blanks or of the blade or vane ring segment for forming the final contour of the blade or vane ring segment can be effected by electrochemical material removal or by milling or by other suitable processes for material-removing shaping.

The remachining of the blade or vane ring segment can be effected in a manner limited to regions of the blade or vane ring segment relevant for fluid dynamics, or can be carried out therein to a particularly intensive or precise extent. The properties of the blade or vane ring segment in terms of fluid mechanics can thereby be improved.

In the process for producing a blade or vane ring segment, one or more heat treatments can be carried out between the joining step and the remachining by material-removing processes or after the final contour has been finished, in order to set the microstructure of the material in such a way that the desired properties, for example strength properties, are achieved. Since the joining processes used are gentle on the microstructure, i.e. have only a small influence on the microstructure formation in the joining zone and/or a limited joining zone, it is possible to carry out individual or a plurality of heat treatment steps both before the joining process and after the joining process and before the remachining for producing the final contour or even after the final contour has been finished. It is advantageous in particular if many process steps can be carried out together for the already joined blanks, so that separate handling of the blanks is not required, which lowers the process costs.

The joining can be effected by laser beam welding, electron beam welding, high-temperature soldering or friction welding, in particular orbital friction welding or multi-orbital friction welding and also linear friction welding. These processes impair a microstructure state of the blanks set by a forging production process of the blanks only to a small extent, and therefore they are particularly suitable for the present process.

The blanks can be preheated above the brittle-ductile transition temperature of the TiAl material during the laser beam welding or electron beam welding, in order to avoid cracking.

In the case of only local heating of the blanks to be joined, the soldering can be carried out in the region of the joining surface, it being possible to provide in particular for inductive heating of local regions.

Titanium-based or nickel-based solders can be used in particular for the soldering. The solders comprise, for example, Ti-based solders, Ti60CuNi, Ti70CuNi, Ni-based solders, AMS 47XX, AMS 4775, AMS 4776, AMS 4777, AMS 4778, AMS 4779 and AMS 4782.

In this respect, Ti-based solder is understood to mean a solder which, like Ti60CuNi or Ti70CuNi for example, has a predominant proportion of titanium or in which titanium forms the greatest constituent part. In the case of Ti60CuNi or Ti70CuNi, the titanium proportion is 60% and 70% by weight, respectively.

In addition, use can be made of Ni-based solders in which in turn nickel forms the predominant proportion or the greatest constituent part. Known nickel solders are sold under the names AMS47XX, where XX as a place holder stands for numbers between 1 and 9. Particular examples which are readily suitable for the present invention are AMS 4775 comprising 14% by weight of chromium, 4.5% by weight of iron, 4.5% by weight of silicon, 3.1% by weight of boron and 0.7% by weight of carbon, remainder nickel and also AMS 4776 comprising 14% by weight of chromium, 4.5% by weight of iron, 4.5% by weight of silicon, 3.1% by weight of boron, remainder nickel, AMS 4777 comprising 7% by weight of chromium, 3% by weight of iron, 4.1% by weight of silicon, 3% by weight of boron, remainder nickel, AMS 4778 comprising 4.5% by weight of silicon, 2.9% by weight of boron, remainder nickel, AMS 4779 comprising 3.5% by weight of silicon, 1.9% by weight of boron, remainder nickel, and also AMS 4782 comprising 19% by weight of chromium, 10% by weight of silicon, remainder nickel.

As already mentioned above, the blanks can already be joined in a very early stage of the production process or can be joined with a shape which greatly differs from the final contour, to be precise for example in the form of cuboids.

Furthermore, the blanks can preferably be formed in a basic shape which is easy to produce, for example as a cuboid, cylinder or the like, but additionally in the region of the intended joining zones can have adapted regions, for example protruding regions, such that merely the required connection regions have to be joined, whereas other regions which are then removed again in any case by material removal during the shaping do not have to be joined. This is advantageous particularly for friction welding, since the pressing forces required during the connection can be kept low as a result.

In the case of the present invention, TiAl materials are understood to mean all materials which are produced on a TiAl basis, i.e. comprise titanium and aluminum as constituent parts with the greatest proportion. In particular, they are to be understood as meaning materials which have intermetallic phases in the microstructure, such as $\alpha_2$-Ti$_3$Al or $\gamma$-TiAl. In addition, the TiAl materials can comprise a very wide variety of alloying elements, for example niobium or molybdenum.

BRIEF DESCRIPTION OF THE DRAWINGS

The attached drawings show in a purely schematic manner in
FIG. 1 an illustration of two blanks for or during joining.

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show details of the present invention in more detail than is necessary for the fundamental understanding of the present invention, the description in combination with the drawings making apparent to those of skill in the art how the several forms of the present invention may be embodied in practice.

Figure 1:
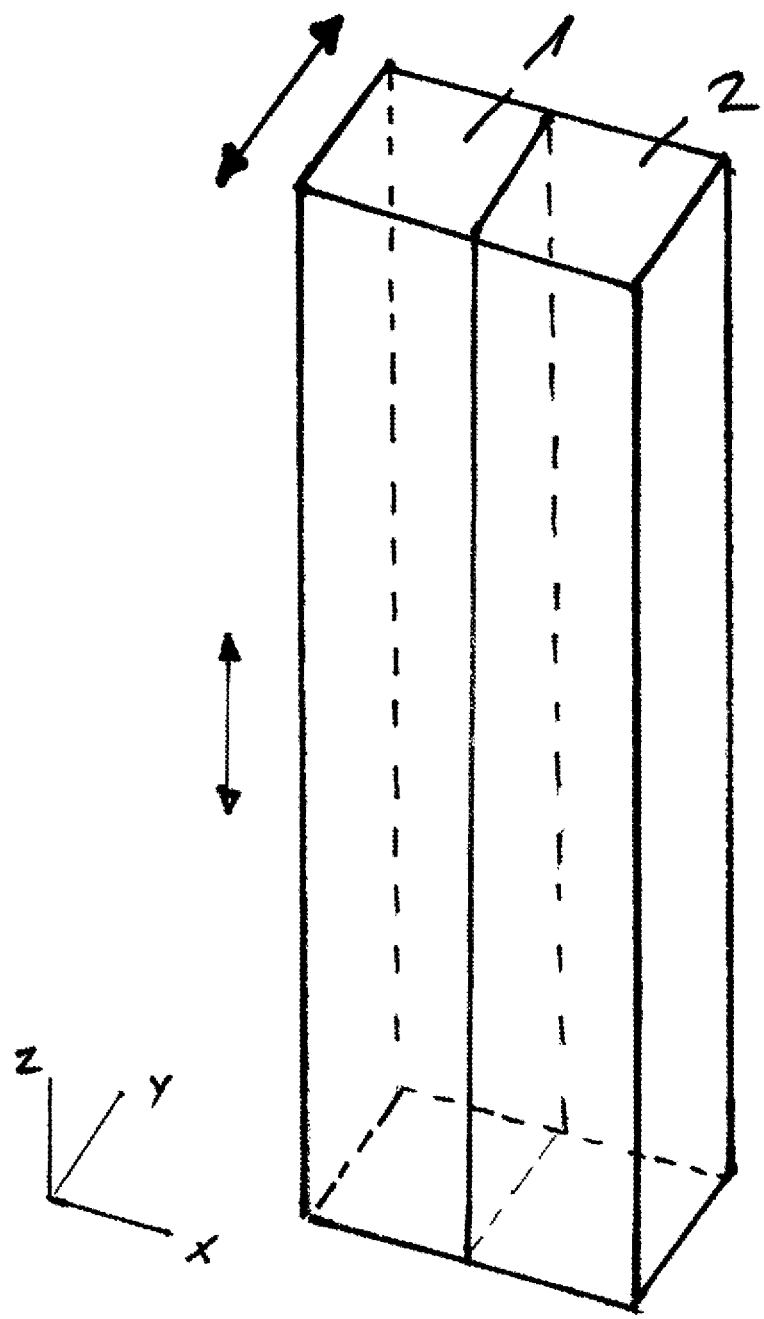

FIG. 1 shows, in a perspective illustration, two blanks 1 and 2 made of a TiAl material which are formed as cuboids. The blanks 1 and 2 are integrally connected to one another along the adjacent side faces which extend in the z and y direction. The integral connection can be effected, for example, by linear friction welding or orbital friction welding or multi-orbital friction welding. The contact pressures for the linear or orbital friction welding can be in the range of between 20 and 200 MPa, preferably in the range of between 40 and 100 MPa. The movement amplitude for the linear friction welding can lie in the range of 1 mm to 8 mm, preferably 2 mm to 4 mm, where a frequency of 15 l/s to 150 l/s, preferably 30 l/s to 100 l/s, can be set for the oscillating movement. The possible relative movements of the blanks during the friction welding are indicated by the double-headed arrows.

Figure 2:
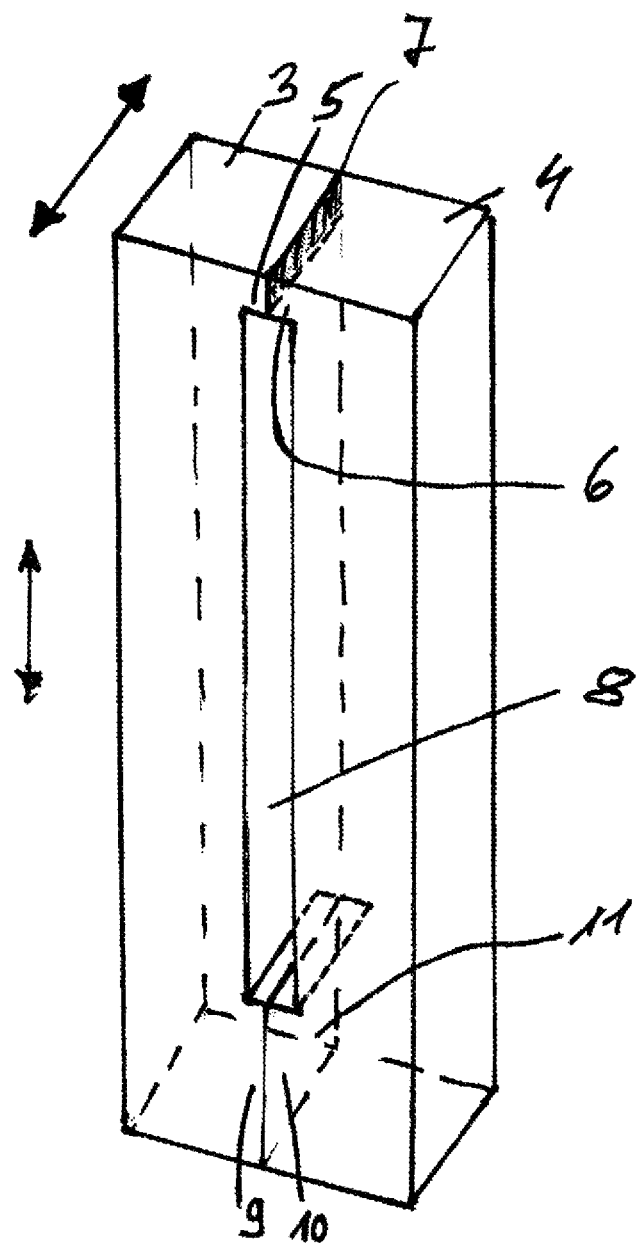
FIG. 2 an illustration of two further blanks for or during joining; and in
FIG. 3 a finished blade or vane ring segment which has been produced according to the present invention.

FIG. 2 shows a second exemplary embodiment, in which two blanks 3, 4 shaped differently to the exemplary embodiment shown in FIG. 1 are joined to one another. The blanks 3, 4 in turn have a substantially cuboidal main body, which, however, has lateral protrusions 5, 6 and, respectively, 9, 10 at each of the ends, so that the blanks 3, 4 have a C shape. The blanks 3, 4 are arranged with the protrusions 5, 6 and 9, 10 against one another and are joined at the resultant contact surfaces, such that the connection regions can also be referred to as joining zones 7, 11.

A gap 8 is formed between the blanks 3, 4 in a central region and, in the finished blade or vane ring segment, already corresponds to a passage between two adjacent main blade or vane parts.

In a manner similar to the embodiment shown in FIG. 1, the blanks 3, 4 can preferably be connected to one another by friction welding, in particular linear friction welding, where in turn the oscillating frictional movement for the friction welding is indicated by the double-headed arrows.

The gap 8 arranged between the blanks 3, 4 to be welded considerably reduces the amount of force which is required for the connection during the friction welding, specifically what is known as the compressive force. In addition, the material removal and the corresponding outlay therefor can also be reduced, since less material has to be removed owing to the gap 8.

The friction welding furthermore has the advantage that no pores or cracks form in the joining zone, since the components to be joined are pressed against one another under pressure.

Figure 3:
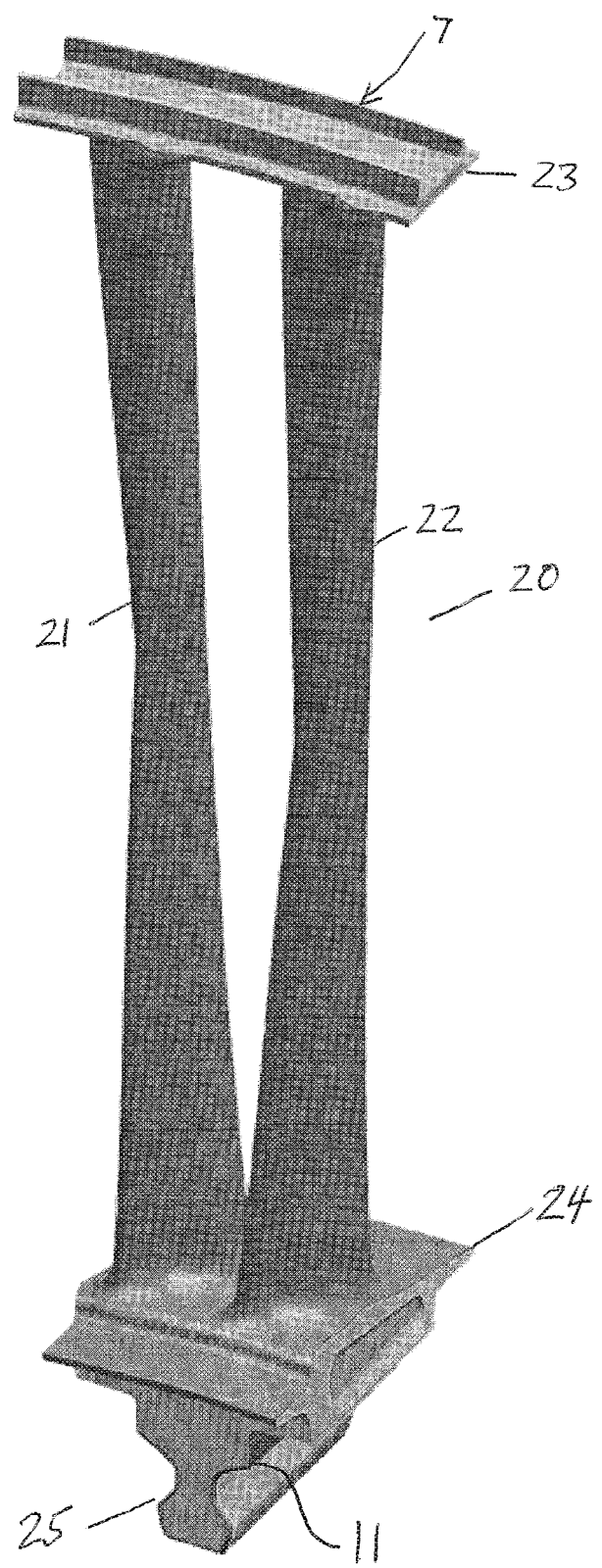

FIG. 3 shows a correspondingly formed blade or vane ring segment 20 having two main blade or vane parts 21 and 22 which are connected to one another by way of an outer shroud 23 and an inner shroud 24. The blade or vane ring segment 20 furthermore has a common blade or vane root 25, which serves to arrange the blade or vane ring segment in a disk of the gas turbine. Instead of having to provide a blade or vane root for each main blade or vane part or each blade or vane, in the blade or vane ring segment 20 according to the invention provision is made of only a single blade or vane root, with which the blade or vane ring segment is arranged in the disk. The joining zone advantageously runs through the center or a central region of the root, such that, owing to the strong formation of the root, the material loading is very low, and therefore impairments of the microstructure by the joining have no effects.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed is:

1. A process for producing a blade or vane ring segment for a gas turbine which comprises at least two adjacent main blade or vane parts having a single common blade or vane root, wherein the process comprises:
    (a) forging at least two blanks made of a TiAl material,
    (b) joining the blanks to form the blade or vane ring segment by an integral connection process, and
    (c) remachining of a blank composite thus obtained by a material-removing process; (b) being carried out to result in a joining zone which extends through only a center or a central region of the common blade or vane root and each blank being formed as a cuboid with protruding joining zones.

2. The process of claim 1, wherein the process further comprises carrying out one or more heat treatments between (b) and (c) or after (c).

3. The process of claim 1, wherein (b) is effected by high-temperature soldering.

4. The process of claim 1, wherein (b) is effected by high-temperature soldering using Ti-based or Ni-based solders.

5. The process of claim 1, wherein (b) is effected by laser beam welding or electron beam welding.

6. The process of claim 5, wherein during laser beam welding or electron beam welding the TiAl material is preheated above a brittle-ductile transition temperature of the TiAl material.

7. The process of claim 1, wherein (b) is effected by high-temperature soldering carried out by local heating.

8. The process of claim 7, wherein the local heating comprises inductive heating.

9. The process of claim 1, wherein (b) is effected by friction welding.

10. The process of claim 9, wherein the friction welding comprises linear friction welding.

11. The process of claim 9, wherein the friction welding comprises orbital friction welding or multi-orbital friction welding.

* * * * *